Figure 7:
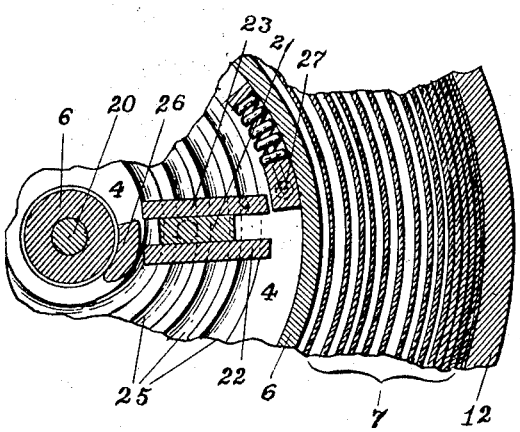

W. S. MAYERS.
ELECTRIC LOCOMOTIVE WITH AUTOMATIC CABLE REEL.
APPLICATION FILED NOV. 18, 1908.
1,100,139.
Patented June 16, 1914.
3 SHEETS—SHEET 1.
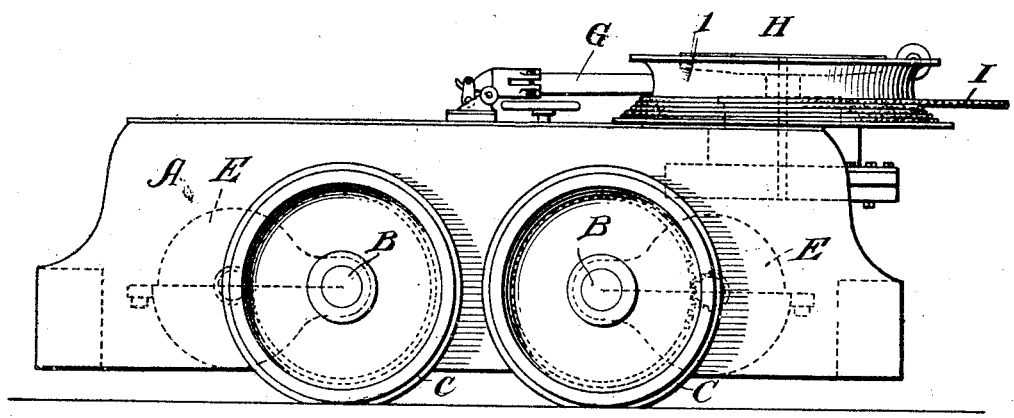
Fig. 1.
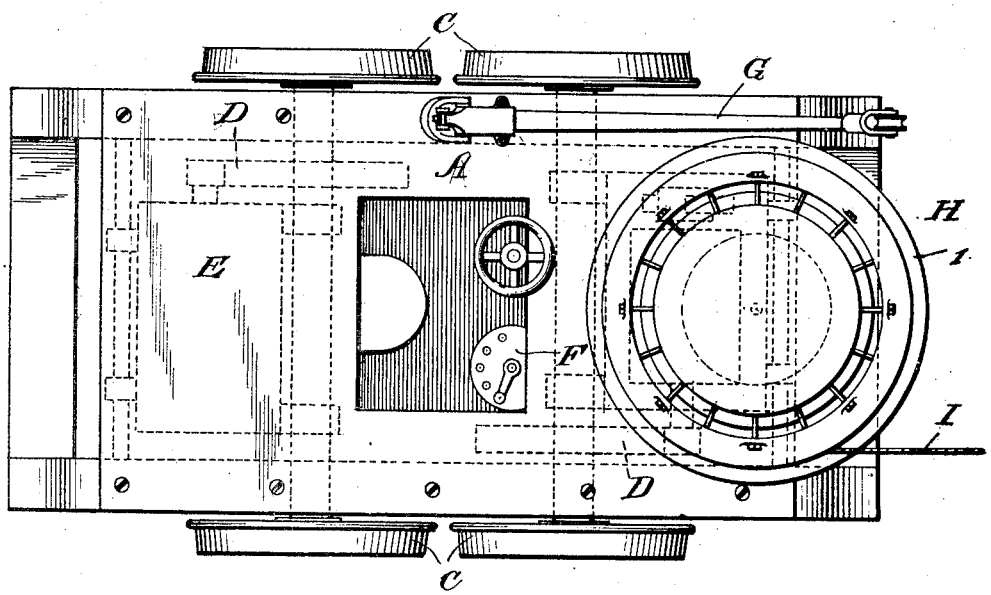
Fig. 2.
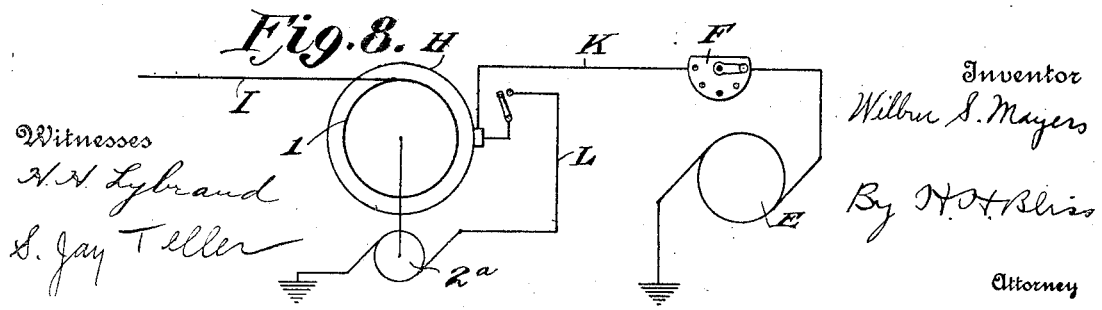
Witnesses
N. N. Lybrand
S. Jay Teller
Inventor
Wilbur S. Mayers
By H. H. Bliss
Attorney

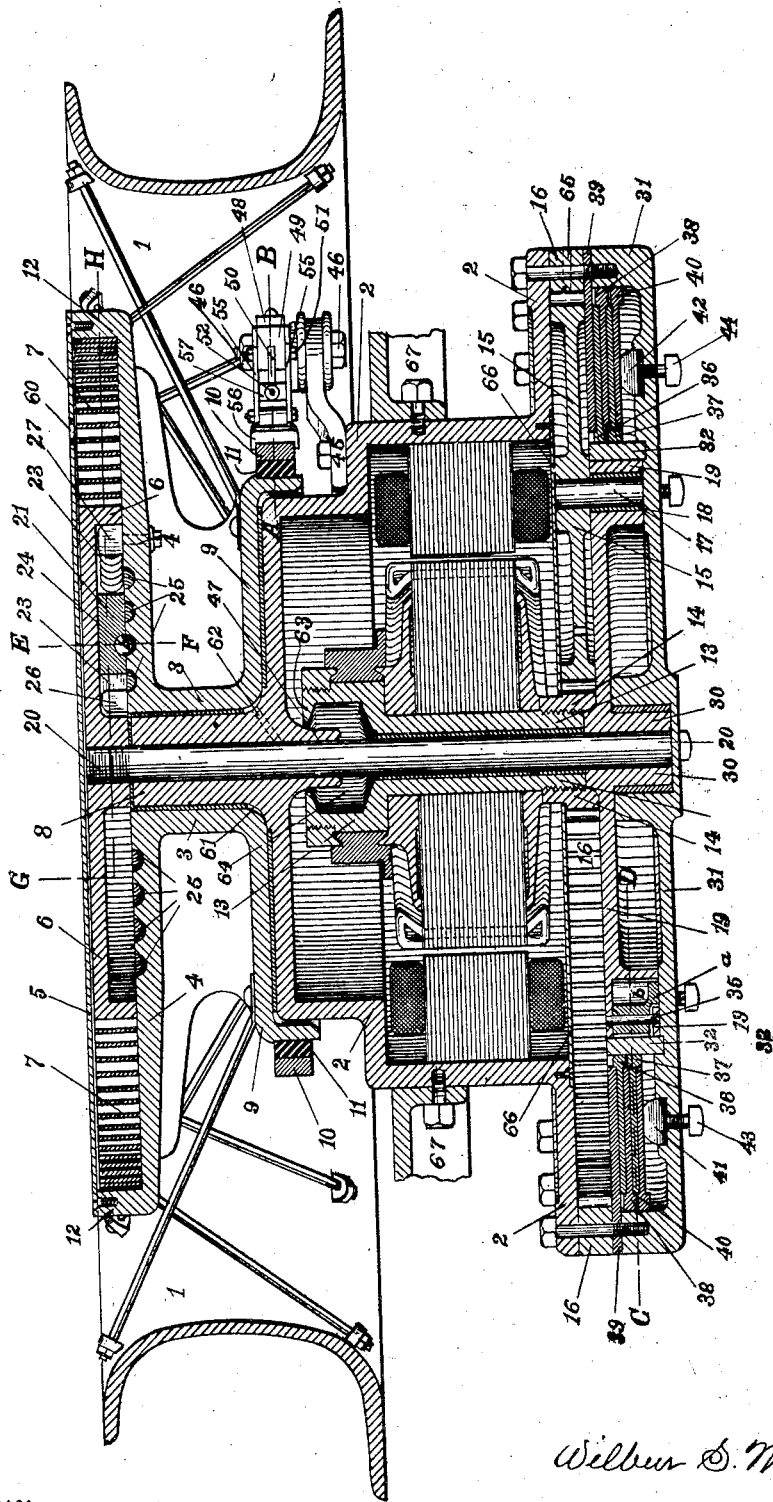

UNITED STATES PATENT OFFICE.

WILBUR S. MAYERS, OF FAIRMONT, WEST VIRGINIA, ASSIGNOR TO THE JEFFREY MANUFACTURING COMPANY, A CORPORATION OF OHIO.

ELECTRIC LOCOMOTIVE WITH AUTOMATIC CABLE-REEL.

1,100,139.

Specification of Letters Patent. Patented June 16, 1914.

Application filed November 18, 1908. Serial No. 463,233.

*To all whom it may concern:*

Be it known that I, WILBUR S. MAYERS, a citizen of the United States, residing at Fairmont, in the county of Marion and State of West Virginia, have invented certain new and useful Improvements in Electric Locomotives with Automatic Cable-Reels, of which the following is a specification.

My invention relates to electric locomotives of the type in which each is provided with a flexible conductor cable and a reel for winding up and paying out the cable as the locomotive moves. As is well known, locomotives of this class are commonly used in mines and other similar places to travel over short sections of track which are not provided with the usual trolley wires. When a track section is met with which has no trolley wire, the end of the conductor cable of the locomotive is connected to a suitable source of current supply, and the locomotive driving motor receives its current through the cable. The locomotive can then advance away from the point of cable attachment, the cable unwinding from the reel as the locomotive advances. When the locomotive returns toward the point of cable attachment, the cable is rewound upon the reel by means of suitable automatically acting mechanism.

A locomotive constructed in accordance with my invention has preferably a reel driving motor which is separate from, and independent of, the main locomotive driving motor; and by preference this separate motor is an electric one receiving its current from the cable itself. One of the objects of my invention is to provide in a locomotive having a cable reeling mechanism, means automatically dependent upon the cable tension or upon the direction of reel rotation for controlling the application to the reel of winding force or of resistance.

When a separate electric reel motor is used, one of the objects of the invention is to provide an automatic means for cutting out the current through the reel motor during unwinding of the cable. A further object is to provide in combination with the means for cutting out the current a brake which can be thrown into operation, preferably automatically, during unwinding.

Another object is to provide in combination with a separate reel motor a resilient driving connection between the motor and the reel, arranged to drive the reel for a few turns in the winding direction.

Still further objects are to provide certain novel combinations of features and details of construction hereinafter fully described, reference being made to the accompanying drawings forming a part of this specification in which—

Figure 6:
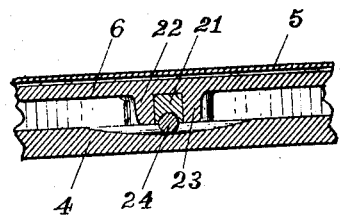
Figure 5:
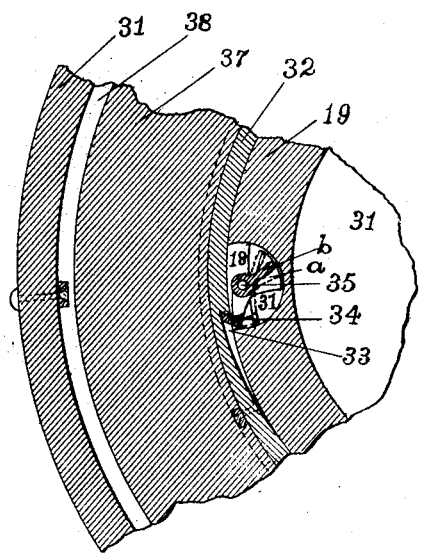
Figure 4:
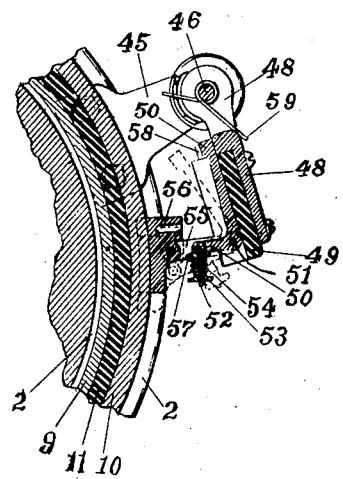

Figure 1 is a side elevation of a locomotive and cable reeling mechanism embodying my invention. Fig. 2 is a plan view. Fig. 3 is a vertical sectional view through the center of the reel showing the essential parts. Fig. 4 is a horizontal sectional detail through the line A—B of Fig. 3. Fig. 5 is a horizontal section through the line C—D of Fig. 3. Fig. 6 is a vertical section through the line E—F of Fig. 3, and Fig. 7 is a horizontal section through the line G—H of Fig. 3. Fig. 8 is a diagram of the electrical connections.

A represents as a whole a mine locomotive which may be of any usual or preferred type. As shown in the drawings, this locomotive has axles B, B, and track wheels C, C. Connected with the axles by means of suitable gearing D, D, are two electric motors E, E. A controller F is provided for the motors, current usually being supplied through the trolley mechanism G.

When it is desired to operate the locomotive in a mine room or other place in which there is no trolley wire to be engaged by the trolley mechanism G, use is made of the cable reeling mechanism H which is mounted on one end of the locomotive. This cable reeling mechanism is provided with a reel or drum 1 driven by a motor 2ª. Upon the reel is wound the cable I, the free end of which can be connected to a trolley wire or other fixed conductor. A conductor connection K is provided for leading the current from the cable I to the controller F and locomotive motors E, E. A second conductor connection L which will hereafter be more fully described is provided for leading the current from the cable to the reel motor 2ª. As the locomotive advances into the mine room or other place, the cable 1 is unwound from the reel and as the locomotive returns, the cable is rewound upon the reel.

Referring to Fig. 3, the cable drum 1 is rotatably mounted upon the case 2, of the motor 2ª. The case 2 is secured to the support 67 which forms one of the cover plates over the locomotive frame. The drum hub 3 has a top flange 4 which with its cover 5 forms a case for the spring drum 6 and spiral spring 7 hereafter described. The hub 3 is journaled upon the tubular extension 8 of the motor case 2 and has a bottom flange 9 resting upon the top of the motor case and forming a step bearing which supports the drum and cable. On the outer edge of the flange 9 is fixed the collector ring 10 insulated by the fiber ring 11. The inner end of the insulated cable conductor terminates at the collector ring 10 making electrical connection therewith, and if a double conductor cable is used, the inner end of the remaining conductor is electrically connected with the metallic parts of the cable drum.

A flat spiral spring 7 is connected at its inner end with the edge of the spring drum 6, and at its outer end with a rim 12 on the flange 4. The spring is so placed that when wound its force will rotate the drum in a counter clockwise direction.

The armature of the motor is mounted tightly upon the hollow shaft or sleeve 13, and to this sleeve at its lower end is keyed or screwed the pinion 14. This pinion meshes into the planetary gear wheel 15 which also meshes into the stationary internal gear 16. In the bore of the planetary gear 15 there is tightly fitted a stud 17, the lower end of which is journaled into a bearing 18 in the transmission wheel 19, this wheel being tightly fixed to the driving shaft 20, and its rotary motion is transmitted therethrough to the spring drum 6 to which it is tightly keyed or screwed to the solid shaft, this shaft being free to rotate in the sleeve 13.

It will thus be seen that the rotary motion of the armature is transmitted to the drum 1 through the sleeve 13, the pinion 14, the gear wheel 15, the stud 17, the wheel 19, the driving shaft 20, the spring drum 6, and the spring 7, in the order named, the drum rotating at a largely reduced speed.

In practice it sometimes happens that, while the cable is winding upon the drum, the electric power is cut off, in which case both the locomotive driving motors and the reel motor suddenly become inactive. In this case the spring 7, which is always kept under tension when there is any tension upon the cable, will have sufficient stored energy to rotate the drum several times after the reel motor has stopped, thus maintaining the tension upon the cable until the motorman succeeds in stopping the locomotive by braking. The spring 7 has another important office in connection with the operation of the collector brush, to be hereafter described.

It is necessary to limit the number of rotations in both directions of the drum 1 relative to the spring drum 6 in order that the spring 7 may not be over strained or distorted and, for this purpose, I employ a multiple turn stopping mechanism shown in vertical section in Fig. 3 and in vertical section in Fig. 6, as seen from a point 90 degrees in a horizontal direction from the view point in Fig. 3. This stop consists of a small block of hardened steel 21 moving between radial guides 22 and 23 on the spring drum 6, and having on its under side a semispherical cavity made to fit the steel ball 24. The ball moves in a spiral groove 25 cut in the top of the hub flange 4 under the spring drum 6, so that with the spring drum stationary, the cable unwinding, and the cable drum rotating against the torque direction of the spring 7, the stop block 21 will be carried by the ball 24 in a radial path toward the center of the drum. With the cable drum rotating in the reverse direction, causing the cable to wind, the stop block 21 will be carried in a radial path away from the center of the drum. When the ball 24 has approached the inner end of the spiral groove 25 the stop block will have been carried toward the center of the drum far enough to engage upon its side the face of the lug 26 lying in a radial plane, thus limiting the travel of the cable drum in that direction relative to the spring drum. In the same manner, when the relative direction of the cable drum is reversed and when the ball has approached the outer end of the spiral groove the stop block will have been carried away from the center of the drum far enough to engage upon its other side the face of the outer lug 27 lying in a radial plane, thus limiting the travel of the cable drum in the other direction. The number of rotations of the cable drum relative to the spring drum between the two described limits depends upon the number of convolutions in the spiral groove. The inner lug 26 is rigidly fixed to the hub flange 4, but the outer lug 27, though attached to said flange, is preferably not rigidly fixed to it, but is slightly movable in a tangential path against a buffer spring in order to lessen the impact shock in case the tension upon the cable is suddenly removed.

A downward extension 30 of the hub of the transmission wheel 19 is journaled into the bottom casing 31, forming a bearing for the wheel 19 and the superimposed gearing and armature.

Surrounding the transmission wheel 19 and loosely fitted thereto is a ring 32, having on its concave side a multiplicity of notches 33, forming a ratchet ring to engage the pawl 34. This pawl is mounted within a recess in the rim of the wheel 19, and swings a small distance horizontally upon the pin 35 which is supported at both ends by projecting parts of the wheel 19. The bottom wing $a$ of the pawl extends down to and is in contact at all times with the upper surface of the bottom casing 31, the weight of the pawl casting producing a slight friction between the two members. This friction is utilized in making automatic the action of the pawl, which is as follows;—when the wheel 19 is turned in a clockwise direction, in which case the cable is paying out, the frictional resistance between the wing $a$ of the pawl and the bottom casing reacts against the pawl and turns it on its pivot 35 in a clockwise direction, thus causing it to engage the notches 33. However, when the wheel 19 is turned in a counter clockwise direction, the reverse action takes place and the frictional resistance maintains the position of the pawl out of engagement with said notches, as shown by the dotted lines in Fig. 5.

The metal in the pawl shown in section at $b$, Fig. 3, as well as the wing $a$, acts as a counterbalance, thus neutralizing the action of the centrifugal force which would tend to keep the pawl in contact with the ratchet ring 32 while the cable is winding, thereby causing considerable wear.

Surrounding the ratchet ring 32 is a set of multiple rings 36, 37, 38, 39, 40 forming a brake and employing a well known principle. The rings 36 and 37 are keyed to the ratchet ring 32, rotating with it, but free to move in a vertical direction. The rings 40 and 38 are keyed to the casing 31 but free to move in a vertical direction. The ring 39 is clamped between the members 16 and 31, and resists the upward pressure imparted to the lower rings by the flat springs 41, 42. Three or more of these springs are employed and they are tensioned by the screws 43, 44 in the bottom casing.

It is evident that the number of friction rings may be increased or diminished, in this manner varying the frictional retardation beyond the limits of the adjustment given to the flat springs by the screws. It is desirable that this frictional retardation should produce the same tension in the cable while paying out, as that produced by the effective motor torque while winding.

The operation of the flat spiral spring 7, as above described, is dependent upon the combined operation of the pawl 34, the ratchet ring 32, and the friction brake, for, without these latter members, the reaction of the spiral spring would rapidly rotate the spring drum 6 and the shaft and gearing connected thereto, in case the electric circuit to or in the motor should be broken while winding the cable thus relieving the tension of the spring and rendering it inoperative. The brake and the ratchet ring serve to prevent the free rotation of the motor and the gearing in the backward direction, and it is therefore impossible for the spring to relieve itself by action on the motor and gearing in case the current is cut off from the motor.

In electrical contact with the collector ring 10 is the collector brush, Figs. 3 and 4, which is so constructed that the circuit to the small reel motor is broken while the cable is paying out, and closed while the cable is winding, the operation of the brush holder being automatic. The bracket 45 is bolted to the motor case 2 and, at its outer end, carries the stud 46 which is insulated by washers and bushing of fiber in the usual manner. Pivotally secured at the top of the stud 46, and swinging freely thereon is a metal arm 48 which carries on its swinging end a grooved block 49, made of insulating material. In said groove there is placed the switch lever 50 pivotally hung on the pin 51 extending through the block 49. The lever 50 has a short arm making a right angle near the pivot end, and at the end of the short arm is attached a hinge bolt 52 having on its swinging end a thumb screw 53 for tensioning the helical spring 54. A double arm metal link 55 is hung at one end upon the projecting ends of the pin 51 and is pivoted at its other end to the metal collector shoe 56. The two arms of the link 55 are connected by a cross piece 57 having in its center a hole to receive the hinge bolt 52.

Adjacent to the swinging end of the switch lever 50 are two spring clips 58, riveted to the arm 48, one on either side of said lever and making electrical contact therewith when the lever is in the position shown by the full lines in Fig. 4. An adjustable spring 59 maintains the proper pressure of the collector shoe 56 against the collector ring 10 through the arm 48 and the link 55.

The main cable or lead from the driving motors of the locomotive is electrically connected to the collector shoe 56, and the lead from the small reel motor connects electrically with the arm 48.

It will be seen that while the drum is rotating in a counter clockwise direction, with the cable winding, all parts of the collector brush will be held in the position shown by the full lines in Fig. 4 by a certain force due to the friction between the collector ring 10 and the shoe 56, and that electrical connection is made from the reel cable to the reel motor as well as to the driving motors. But when the direction of rotation of the drum is changed to clockwise, with the cable paying out, the friction between said collector ring and shoe causes the latter to advance a short distance in the direction of rotation, carrying with it the link 55 and the switch lever 50, which members will take the position shown by the dotted lines in Fig. 4. When this occurs the electrical connection between the spring clips 58 and the lever 50 is broken, cutting off the current from the reel motor, still maintaining, however, the electrical connection between the reel cable and the driving motors through the various members as above described.

The operation of the switch lever in connection with the link 55, the hinge bolt 52, and the helical spring 54 is that of the ordinary quick break switch.

When the collector shoe 56 is in the position shown by the full lines in Fig. 4, with the lever 50 in contact with the spring clips 58, the cable drum is either rotating in a counter clockwise direction or stationary. If the cable drum is now caused to rotate in a clockwise direction the motion imparted to the collector shoe by friction, as above described, is transmitted to the spring 54, through the links 55 and cross piece 57, and the spring is compressed to its limit or to a point where its tension, which is exerted through the thumb screw 53 and hinge bolt 52 to the lever 50, overcomes the frictional retardation due to its contact with the spring clips. When this contact is broken the frictional retardation no longer exists and the lever, being free to move, is quickly thrown into a position beyond arcing distance, shown approximately by the dotted lines. In this manner the electric arc which forms between the lever and the spring clips is quickly extinguished.

In its normal position the short arm of the lever 50 is held in contact with the crosspiece 57 by the tension of the spring 54, and their relative positions are changed only during the short time required in opening the switch as above described.

When the cable drum starts to rotate in a counter clockwise direction with the switch open the collector shoe, owing to the friction between it and the collector ring, takes the position shown in Fig. 4 by the full lines, and its movement is imparted by the said link and cross-piece to the short arm of the lever, thus forcing its long arm into contact with the spring clips.

In connection with the operation of this switch the spiral spring 7 plays an important part. Taking the case where the locomotive has reached the end of its run in which the cable has paid out from the reel. In this case the switch lever 50 will be in the position shown in Fig. 4 by the dotted lines. Now when the locomotive is reversed the circuit to the reel motor would remain broken between the said switch lever and the spring clips were it not for the fact that the spring 7 will rotate the drum and collector ring in a counter clockwise direction to an extent amply sufficient to shift the collector shoe to its other position thus closing the circuit to the reel motor.

The bearings, gear wheels, friction rings, and other moving parts are designed so that their lubrication will be simple and effective, and there is but one oil hole required which is shown at 60 in the spring case cover 5. The oil entering at this point lubricates the spring 7, the disk 6, and the stop block 21, and then passes downward through the bearings, part of it lubricating the drum hub 3 and the step bearing 9, and the remainder passing downward along the solid shaft 20 through the hollow shaft 13 to the bottom of the case. Any excess of oil entering the drum hub bearing collects in the annular cavity 61, and is drained therefrom into the upper bearing of the solid shaft 20 through one or more holes 62. The oil is prevented from reaching the commutator of the motor by the tubular downward extension 47 from the casing 2 into the oil collecting chamber 64. In this chamber any oil which may have collected is held at the outer walls by centrifugal force while the motor armature is rotating and is prevented from rising by the inwardly projecting flange 63. When the armature is at rest this oil gravitates between the solid shaft 20 and the hollow shaft 13, escaping through the step bearing at the bottom of the hollow shaft into the gear case 31. The gear case being oil tight, the oil collects in it up to the overflow 65 from whence it may be piped to a receptacle or elsewhere, and all the gear wheels, friction rings, and other parts within the gear case 31 are thus kept immersed in oil.

The annular diaphragm 66, which is closely fitted around the hub of the pinion 14 and tightly screwed to the bottom of the motor casing 2 prevents the splashing of the oil into the motor parts.

It is evident that the direction of rotation of all parts above described may be reversed without changing their functions, provided that the spring 7, the spiral groove 25, the ratchet ring 32, the pawl 34, and the brush holder are also reversed.

The parts within the motor casing 2 not described above, comprise the armature, pole pieces, and field coils of the motor which may be of any well known construction.

In a separate application, Serial No.

560,354, filed May 9, 1910, as a division of this application, I have presented claims covering the structure herein disclosed so far as it is adapted for use as a winding mechanism independent of a locomotive or equivalent device.

While I have described in detail one form of mechanism embodying my invention, it will be understood that various modifications may be made within the scope of the appended claims. For instance, so far as certain features of my invention are concerned, any well-known driving means for the reel may be used, and the invention is not limited to the separate electric motor herein shown and described. Similarly as to other features of the invention, there can be changes and modifications.

Having thus described my invention, the following is what is claimed as new therein:

1. An automatic cable reel comprising a casing, an electric motor, speed reduction gearing and connecting members, a driving shaft, a cable drum mounted upon said casing, means for rotating said cable drum relatively to said driving shaft a limited number of times while winding the cable after the motor torque has ceased, means for producing tension upon the cable while paying out with the motor circuit broken, and means to automatically break the motor circuit when the cable begins paying out and to reëstablish said circuit when the cable begins winding.

2. An automatic cable reel comprising a casing, a motor, speed reduction gearing and connecting members, a driving shaft and spring drum, a cable drum mounted upon said casing and driven by said motor through gearing and connections, a brake for retarding the motion of the rotating parts while the cable is paying out,—the motor circuit being broken, a combined brush holder and automatic switch in the circuit of the motor and means for rotating the cable drum relatively to the spring drum sufficiently to actuate the automatic switch at the point where the cable ceases paying out and where it begins to wind.

3. An automatic cable reel comprising a casing, an electric motor, speed reduction gearing and connecting members, a cable drum mounted upon said casing and driven by said motor through said gearing and connecting members, a driving shaft, means for rotating said cable drum relatively to said driving shaft a limited number of times while winding the cable after the motor torque has ceased, means for restricting the counter rotation of the members within said casing due to the reaction of said spring, means for producing tension upon the cable while paying out with the motor circuit broken, and a combined brush holder and automatic switch for breaking the motor circuit when the cable begins paying out and reëstablishing said circuit when the cable begins winding.

4. In an automatic cable reel of the character described, the combination of a cable drum, a collector ring thereon, a brush holder, an insulated brush or shoe held against the collector ring, the brush being mounted so that it is moved with the collector ring in either direction within certain limits by means of friction between it and the collector ring, a switch on the brush holder, and means for actuating the switch by the movable shoe through connecting members.

5. In an automatic cable reel of the character described, the combination with the reel and a collector ring on the reel, of a brush and a combined brush holder and automatic quick-break switch comprising a supporting bracket, an insulated stud on the bracket, an arm pivotally mounted on the stud, contact clips on the arm electrically connected thereto, a switch lever carried by the arm but insulated therefrom except when in contact with the said clips, connecting links between the arm and the brush, a spring connection between the said links and the lever, and an adjustable spring at the pivot end of the arm for maintaining an even pressure of the brush upon the collector ring.

6. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a train of power transmitting elements connecting the second motor and the reel, and automatically acting means for cutting out the current from the said second motor when the reel rotates in the cable unwinding direction.

7. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a train of power transmitting elements connecting the second motor and the reel, and automatic means controlled by the direction of rotation of the reel for breaking the electric circuit through the said second motor when the reel is rotated in the cable unwinding direction and for completing the circuit through the motor when the reel is rotated in the cable winding direction.

8. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a train of power transmitting elements connecting the said second motor and the reel, and automatic means acting to break the circuit through the motor when the reel is rotated in the cable unwinding direction by an external force and to complete the circuit through the motor when the conditions of operation are such as to permit the reel to rotate in the cable winding direction.

9. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, and means for applying power to rotate the reel, said means being automatically thrown out of or into operation, depending upon whether the reel is rotated in the cable unwinding direction or is permitted to rotate in the cable winding direction.

10. In an electric locomotive, the combination with the main frame, the axles and track wheels and the motor connected with the track wheels to drive the locomotive, of a reel mounted upon the frame, a conductor cable connected to the reel to be wound thereon and adapted to be secured at its free end to a fixed conductor, a second electric motor supplemental to the said locomotive driving motor, a train of power transmitting elements connecting the said second motor and the reel, a conductor connection between the cable and the said locomotive driving motor, a second conductor connection between the cable and the reel driving motor, a switch in the second conductor connection, and means for automatically opening or closing the said switch when the direction of rotation of the reel is reversed.

11. In an electric locomotive, the combination with the main frame, the axles and track wheels and the motor connected with the track wheels to drive the locomotive, of a reel mounted upon the frame, a conductor cable connected to the reel to be wound thereon and adapted to be secured at its free end to a fixed conductor, a second electric motor supplemental to the said motor for driving the locomotive, a train of power transmitting elements connecting the said second motor and the reel, a conductor connection between the cable and the said motor for driving the locomotive, a second conductor connection between the cable and the reel driving motor, a switch in the said second conductor connection, means for automatically opening or closing the said switch when the direction of rotation of the reel is reversed, and a spring arranged to reverse the direction of rotation of the reel from unwinding to winding when the tension of the cable will permit.

12. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a train of power transmitting elements connecting the second motor and the reel, including an energy storing and expending spring a friction brake for applying friction to one of the elements, operatively further from the reel than is the said spring means for automatically applying the brake when the element is rotated in the cable unwinding direction and for releasing it when the element is rotated in the cable winding direction, and means for automatically breaking the circuit through the second motor when the reel is rotated in the cable unwinding direction and for automatically completing the circuit through the second motor when the reel is permitted to rotate in the cable winding direction under the influence of the spring.

13. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a train of power transmitting elements connecting the second motor and the reel, a friction brake for retarding the rotation of the reel, automatic means for completing the circuit through the second motor when the reel is rotated in the winding direction and for breaking the circuit through the motor when the reel is rotated in the unwinding direction, and means for automatically applying the brake when the reel is rotated in the cable unwinding direction and for automatically releasing the brake when the reel is rotated in the cable winding direction.

14. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a conductor connection between the cable and the second motor, a train of power transmitting elements connecting the second motor and the reel, a brake for retarding the rotation of the reel, automatic means for breaking of the circuit through the second motor when the reel is rotated in the cable unwinding direction and for completing the circuit through the motor when the reel is rotated in the cable winding direction, means for automatically applying the said brake when the reel is rotated in the cable unwinding direction and for automatically releasing the brake when the reel is rotated in the cable winding direction, and means supplemental to the second motor for turning the reel in the cable winding direction when the circuit through the motor is broken.

15. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a conductor connection between the cable and the second motor, a train of power transmitting elements connecting the motor and the reel, a brake for retarding the rotation of the motor, means for automatically breaking the circuit through the motor when the reel is rotated in the cable unwinding direction and for automatically completing the circuit through the motor when the reel is rotated in the cable winding direction, and means for applying the brake when the reel is rotated in the cable unwinding direction and releasing it when the reel is rotated in the cable winding direction.

16. In an electric locomotive, the combination with the main frame, the axles and track wheels and the motor connected with the track wheels to drive the locomotive, of a reel mounted upon the frame, a conductor cable connected to the reel to be wound thereon and adapted to be secured at its free end to a fixed conductor, a second electric motor supplemental to the said motor for driving the locomotive, a train of power transmitting elements connecting the said second motor and the reel, a conductor connection between the cable and the said motor for driving the locomotive, a second conductor connection between the cable and the reel driving motor, a switch in the said second conductor connection, means for automatically opening the said switch when the tension in the cable is sufficient to cause the rotation of the reel in the unwinding direction and for automatically closing the said switch when the tension in the cable is such as to permit the rotation of the reel in the winding direction.

17. In an electric locomotive, the combination with the main frame, the axles and track wheels and the motor connected with the track wheels to drive the locomotive, of a reel mounted upon the frame, a conductor cable connected to the reel to be wound thereon and adapted to be secured at its free end to a fixed conductor, a second electric motor supplemental to the said motor for driving the locomotive, a train of power transmitting elements connecting the said second motor and the reel, a conductor connection between the cable and the said motor for driving the locomotive, a second conductor connection between the cable and the reel driving motor, and means automatically controlled by the tension in the cable for regulating the flow of current through the said reel driving motor as the cable tension varies.

18. In an electric locomotive, the combination with the main frame, the axles and track wheels and the motor connected with the track wheels to drive the locomotive, of a reel mounted upon the frame, a conductor cable connected to the reel to be wound thereon and adapted to be secured at its free end to a fixed conductor, a second electric motor supplemental to the said motor for driving the locomotive, a train of power transmitting elements connecting the said second motor and the reel, a conductor connection between the cable and the said motor for driving the locomotive, a second conductor connection between the cable and the reel driving motor, a switch in the said second conductor connection, means for automatically opening the said switch when the reel is rotated in the unwinding direction and for automatically closing the said switch when the reel is rotated in the winding direction, and a device supplemental to the reel driving motor for turning the reel in the cable winding direction when the circuit through the motor is broken.

19. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a train of power transmitting elements connecting the said motor and the reel including an energy storing and expending spring, and means for automatically breaking the circuit through the second motor when the reel is rotated in the cable unwinding direction and for automatically completing the circuit through the second motor when the reel is permitted to rotate in the cable winding direction under the influence of the spring.

20. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a conductor connection between the cable and the second motor, a train of power transmitting elements connecting the second motor and the reel, a brake for retarding the rotation of the reel, automatic means for breaking the circuit through the second motor when the reel is rotated in the cable unwinding direction and for completing the circuit through the motor when the reel is rotated in the cable winding direction, means whereby the said brake can be applied when the reel is rotated in the cable winding direction and released when the reel is rotated in the cable winding direction, and means supplemental to the second motor for turning the reel in the cable winding direction when the circuit through the motor is broken.

21. In an electric locomotive, the combination with the main frame, the axles and supporting wheels and the main driving motor, of a reel mounted upon the frame, a conductor cable connected to the reel to be wound thereon and adapted to be secured at its free end to a fixed conductor, a conductor connection between the cable and the main motor, a second electric motor supplemental to the said main driving motor, a train of power transmitting elements connecting the second motor and the reel, including an energy storing and expending spring, a friction brake for applying friction to one of the elements operatively farther from the reel than is the spring, means whereby the brake can be applied when the reel is rotated in the cable unwinding direction and released when the reel is rotated in the cable winding direction, and means for automatically breaking the circuit through the second motor when the reel is rotated in the cable unwinding direction and for automatically completing the circuit through the second motor when the reel is permitted to rotate in the cable winding direction under the influence of the spring.

22. The combination in an electric locomotive, of a rotatable cable reel, an electric conductor cable on the reel, power means connected with the reel to rotate it in the cable winding direction, and means for automatically throwing the power means out of operation when the reel is rotated in opposition to the power means in the cable unwinding direction.

23. The combination in an electric locomotive, of a rotatable cable reel, an electric conductor cable on the reel, power means connected with the reel and adapted to rotate it in the cable winding direction, and means for automatically throwing the power means into operation when the reel is rotated in the cable winding direction.

24. The combination in an electric locomotive, of a rotatable cable reel, an electric conductor cable on the reel, power means connected with the reel and adapted to rotate it in the cable winding direction, means for automatically throwing the power means into operation when the reel is rotated in the cable winding direction, and means supplemental to the motor for automatically rotating the reel in the winding direction whenever the cable tension permits.

25. The combination in an electric locomotive, of a rotatable cable reel, an electric conductor cable on the reel, power means connected with the reel and adapted to rotate it in the cable winding direction, means for automatically throwing the power means into operation when the reel is rotated in the cable winding direction, and an energy receiving and expending spring tending automatically to rotate the reel in the winding direction independently of the motor.

26. The combination in an electric locomotive, of a rotatable cable reel, an electric conductor cable on the reel, power means connected with the reel to rotate it in the cable winding direction, means for automatically throwing the power means out of operation when the reel is rotated in opposition to the power means in the cable unwinding direction, and a brake for resisting the rotation of the reel in the cable unwinding direction.

27. The combination in an electric locomotive, of a rotatable cable reel, an electric conductor cable on the reel, power means connected with the reel to rotate it in the cable winding direction, means for automatically throwing the power means out of operation when the reel is rotated in opposition to the power means in the cable unwinding direction, a brake for resisting the rotation of the reel, and automatic means for causing the brake to act only when the reel is rotated in the cable unwinding direction.

28. The combination in an electric locomotive, of a rotatable cable reel, an electric conductor cable on the reel, power means connected with the reel and adapted to rotate it in the cable winding direction, means for automatically throwing the power means into operation when the reel is rotated in the cable winding direction, and a brake for resisting the rotation of the reel in the cable unwinding direction.

29. The combination in an electric locomotive, of a rotatable cable reel, an electric conductor cable on the reel, power means connected with the reel and adapted to rotate it in the cable winding direction, means for automatically throwing the power means into operation when the reel is rotated in the cable winding direction, a brake for resisting the rotation of the reel, and automatic means for causing the brake to act only when the reel is rotated in the cable unwinding direction.

30. The combination in an electric locomotive, of a rotatable cable reel, an electric conductor cable on the reel, power means connected with the reel to rotate it in the cable winding direction, means for automatically throwing the power means out of operation when the reel is rotated in opposition to the power means in the cable unwinding direction, and for automatically throwing the power means into operation when the reel is rotated in the cable winding direction, and a brake for resisting the rotation of the reel in the cable unwinding direction.

31. The combination in an electric locomotive, of a rotatable cable reel, an electric conductor cable on the reel, power means connected with the reel to rotate it in the cable winding direction, means for automatically throwing the power means out of operation when the reel is rotated in opposition to the power means in the cable unwinding direction, and for automatically throwing the power means into operation when the reel is rotated in the cable winding direction, a brake for resisting the rotation of the reel, and automatic means for causing the brake to act only when the reel is rotated in the cable unwinding direction.

32. The combination in an electric locomotive, of a rotatable cable reel, an electric conductor cable on the reel, a motor supplemental to and operable independently of the main locomotive motor, a power connection between the supplemental motor and the reel, and means controlled by the tension in the cable for regulating the action of the said supplemental motor.

33. In an electric locomotive, the combination of a rotatable cable reel, an electric conductor cable on the reel, a motor supplemental to and operable independently of the main locomotive motor, a power connection between the supplemental motor and the reel, and means automatically operable when the reel is rotated in the unwinding direction for causing the supplemental motor to be inoperative.

34. In an electric locomotive, the combination of a rotatable cable reel, an electric conductor cable on the reel, a motor supplemental to and operable independently of the main locomotive motor, a power connection between the supplemental motor and the reel, means automatically operable when the reel is rotated in the unwinding direction for causing the supplemental motor to be inoperative, and for causing the said supplemental motor to become operative when there is a decrease in the cable tension.

35. In an electric locomotive, the combination of a rotatable cable reel, an electric conductor cable on the reel, a motor supplemental to and operable independently of the main locomotive motor, a power connection between the supplemental motor and the reel, and means automatically operable when the reel is rotated in the unwinding direction for causing the supplemental motor to be inoperative and automatically operable when the reel is rotated in the winding direction for causing the supplemental motor to become operative.

36. In an electric locomotive, the combination of a rotatable cable reel, an electric conductor cable on the reel, a motor supplemental to and operable independently of the main locomotive motor, a power connection between the supplemental motor and the reel, means automatically operable when the reel is rotated in the unwinding direction for causing the supplemental motor to be inoperative, and automatically operable when the reel is rotated in the winding direction for causing the supplemental motor to become operative, and means supplemental to the motor for automatically rotating the reel in the winding direction whenever the cable tension permits.

37. In an electric locomotive, the combination of a rotatable cable reel, an electric conductor cable on the reel, a motor supplemental to and operable independently of the main locomotive motor, a power connection between the supplemental motor and the reel, comprising an energy receiving and expending spring tending automatically to rotate the reel in the winding direction independently of the motor, and means automatically operable when the reel is rotated in the unwinding direction for causing the supplemental motor to be inoperative and 38. In an electric locomotive, the combination of a rotatable cable reel, an electric conductor cable on the reel, a motor supplemental to and operable independently of the main locomotive motor, a power connection between the supplemental motor and the reel, means automatically operable when the reel is rotated in the unwinding direction for causing the supplemental motor to be inoperative, and a brake operable for resisting the rotation of the reel in the unwinding direction.

39. In an electric locomotive, the combination of a rotatable cable reel, an electric conductor cable on the reel, a motor supplemental to and operable independently of the main locomotive motor, a power connection between the supplemental motor and the reel, comprising an energy receiving and expending spring tending automatically to rotate the reel in the winding direction independently of the motor, means automatically operable when the reel is rotated in the winding direction by the spring for causing the supplemental motor to become operative, and a brake operable for resisting the rotation of the reel in the unwinding direction.

40. The combination in an electric locomotive, of a rotatable cable reel, an electric conductor cable on the reel, a motor supplemental to the main locomotive motor and adapted to exert a uniform continuous rotative force irrespective of the bodily movement of the locomotive, and a series of power transmitting elements including a spring between the supplemental motor and the reel.

41. The combination of an electric locomotive, of a rotatable cable reel, an electric conductor cable on the reel, power mechanism for driving the reel comprising a rotating shaft and a series of power transmitting elements including a spring interposed between the shaft and reel, and automatically acting means supplemental to the spring for limiting the extent to which the reel can be rotated independently of the shaft.

42. The combination in an electric locomotive, of a rotatable cable reel, an electric conductor cable on the reel, a motor supplemental to the main locomotive motor and adapted to exert a uniform continuous rotative force irrespective of the bodily movement of the locomotive, a series of power transmitting elements including a spring between the motor and the reel, and means supplemental to the spring for limiting relative movement of the parts against the action of the spring.

43. The combination in an electric locomotive, of a rotatable cable reel, an electric conductor cable on the reel, a driving mechanism for the reel comprising a rotatable shaft and a spring interposed between the shaft and the reel, and a brake supplemental to the driving mechanism for resisting the rotation of the shaft in one direction.

44. The combination in an electric locomotive, of a rotatable cable reel, an electric conductor cable on the reel, a reel controlling mechanism comprising a rotary shaft and a spring interposed between the shaft and the reel, means supplemental to the spring for limiting the relative movement between the shaft and reel against the action of the spring, and a brake for resisting the rotation of the shaft.

45. The combination in an electric locomotive, of a rotatable cable reel, an electric conductor cable on the reel, a motor supplemental to the main locomotive motor and adapted to exert a uniform continuous rotative force irrespective of the bodily movement of the locomotive, a series of power transmitting elements including a spring interposed between the motor and the reel, and a brake for resisting the movement of the power transmitting elements which are operatively farther from the reel than is the said spring.

46. The combination in an electric locomotive, of a rotatable cable reel, a cable upon the reel, a motor supplemental to the main locomotive motor and adapted to exert a uniform continuous rotative force irrespective of the bodily movement of the locomotive, a series of power transmitting elements including a spring interposed between the motor and the reel, means supplemental to the spring for limiting the extent to which the reel can be turned independently of the motor, and a brake for resisting the movement of the power transmitting elements which are operatively farther from the reel than is the said spring.

47. The combination in an electric locomotive, of a rotatable cable reel, an electric conductor cable on the reel, a motor supplemental to the main locomotive motor and adapted to exert a uniform rotative force irrespective of the bodily movement of the locomotive, a power connection between the motor and the reel, a brake supplemental to the said power connection for resisting the movement of the reel in the unwinding direction, and means for automatically causing the brake to act only when the reel is rotated in the unwinding direction.

48. The combination in an electric locomotive, of a rotatable cable reel, an electric conductor cable on the reel, power means for driving the reel in the cable winding direction, a brake comprising two frictionally-engaging normally stationary elements, and means for connecting one of the elements of the said brake with the reel when the reel is rotated in the cable unwinding direction.

49. The combination in an electric locomotive, of a rotatable cable reel, an electric conductor cable on the reel, power means for driving the reel in the cable winding direction, a brake comprising two frictionally-engaging normally stationary elements, and automatically acting means for connecting one of the elements of the said brake with the reel only when the reel is rotated in the cable unwinding direction.

In testimony whereof I affix my signature in the presence of two witnesses.

WILBUR S. MAYERS.

Witnesses:
C. D. FLEMING,
C. L. COOK.